United States Patent [19]

Murugan

[11] Patent Number: 5,694,307

[45] Date of Patent: Dec. 2, 1997

[54] INTEGRATED AC/DC AND DC/DC CONVERTER

[75] Inventor: Muthu K. Murugan, Howell, N.J.

[73] Assignee: AlliedSignal Inc., Morristown, N.J.

[21] Appl. No.: 724,565

[22] Filed: Sep. 30, 1996

[51] Int. Cl.$^6$ ................................................. H02M 5/45
[52] U.S. Cl. ................................. 363/37; 363/34
[58] Field of Search ....................... 363/34–37, 65, 363/67, 69–71; 307/44, 45, 66, 72–75, 82, 83

[56] References Cited

U.S. PATENT DOCUMENTS

| | | | |
|---|---|---|---|
| 4,618,923 | 10/1986 | Meisel et al. | 363/144 |
| 4,737,900 | 4/1988 | Kahkipur et al. | 363/37 |
| 4,992,920 | 2/1991 | Davis | 363/36 |
| 5,483,140 | 1/1996 | Hess et al. | 363/34 |

*Primary Examiner*—Matthew V. Nguyen
*Attorney, Agent, or Firm*—Verne E. Kreger, Jr.

[57] ABSTRACT

In an illustrative embodiment, a power converter for starting an AC machine comprises at least one transformer for stepping-up AC source voltages, at least one rectifier for rectifying output voltages from the at least one transformer, a three phase inverter for inverting rectified voltages from the at least one rectifier for providing three phase voltages for starting the AC machine, and a DC to AC converter for converting DC source voltage to AC inverted voltages. The three phase voltages for starting the AC machine are derived from one of the AC and DC source voltages through the at least one transformer and the at least one rectifier.

20 Claims, 8 Drawing Sheets

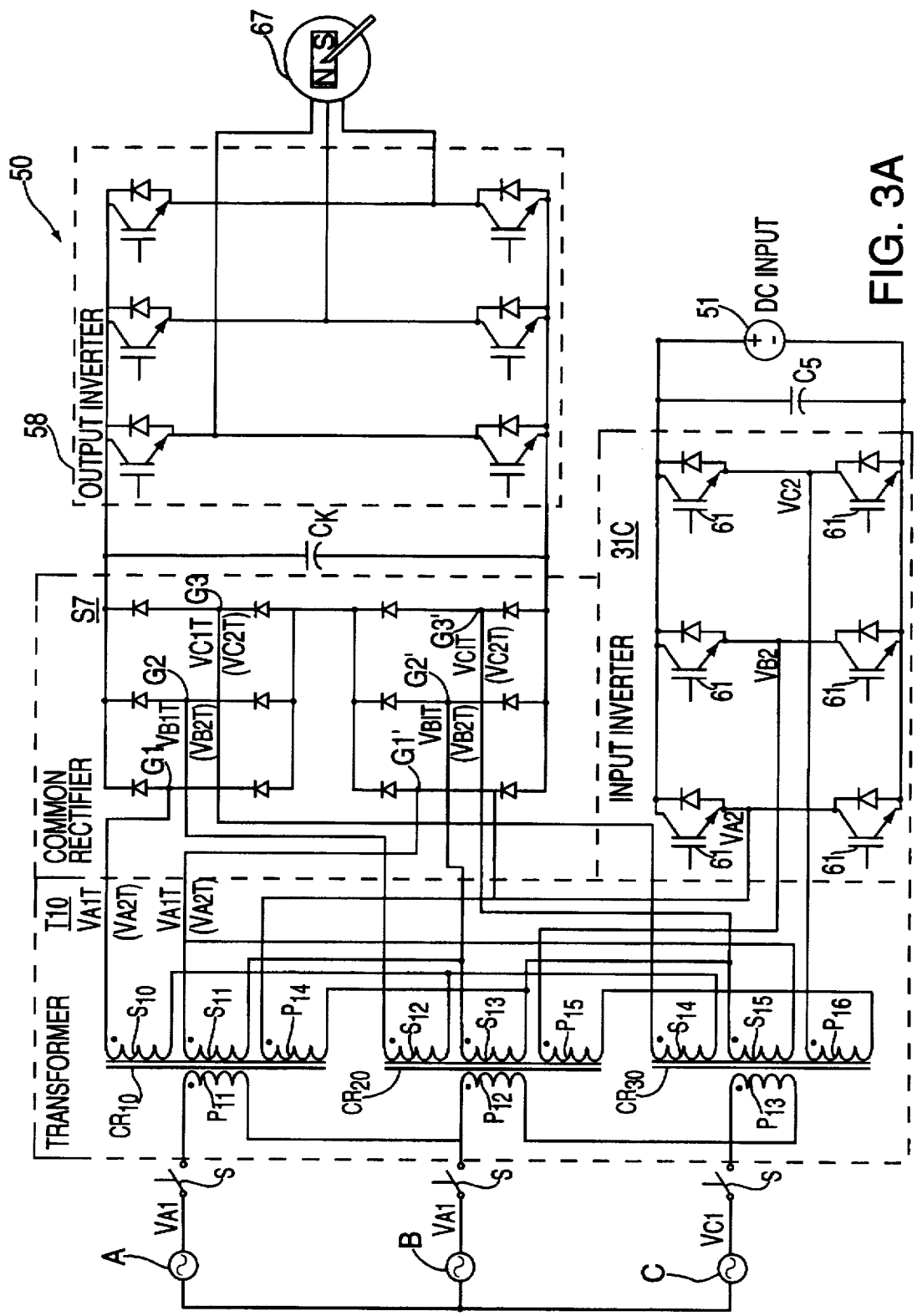

5,694,307

1

INTEGRATED AC/DC AND DC/DC CONVERTER

FIELD OF THE INVENTION

The present invention relates generally to power converters and, more particularly, to a power converter having an integrated AC/DC and DC/DC converter capable of starting an AC machine from either a DC or AC input source.

BACKGROUND OF THE INVENTION

There are various applications in which it is desirable to have the capability of starting an AC machine using either an AC or DC input source. For example, in aerospace applications a three phase AC source and a DC source are typically available. The ability to start an engine using either one of these sources provides enhanced system reliability.

A variety of power converter designs that afford start capability from AC or DC inputs are in existence. These conventional start converters utilize separate front end start converters, one for AC start (AC/DC converter) and the other for DC start (DC/DC converter). An example of such a start converter is shown in FIG. 1. Start converter 10 includes an AC/DC converter 12 that converts a three phase AC input to DC when switches S1 are closed. Three phase transformer 22 steps up the three phase AC voltage, rectifier bridge 24 rectifies the transformer voltage output, and the rectified output is supplied to a three phase DC/AC inverter 16, the output of which drives AC machine 17. The AC machine may be a synchronous, induction or permanent magnet machine. By pulse width modulation control of inverter 16, variable frequency and voltage can be provided to AC machine 17.

DC activation of machine 17 by DC battery 15 is by selectively switching on transistors 13 of DC/DC converter 14, producing multi-phase AC, which is stepped up in voltage by multi-phase transformer 28, and then rectified by rectifier stage 19. DC/AC inverter 16 then converts the rectified output to AC to drive AC machine 17. During DC activation, the AC inputs are off with switches S1 open.

Power converters utilizing separate front end start converters, such as the converter 10 just described, exhibit increased weight and decreased reliability. Accordingly, there exists a need for a power converter that is devoid of such drawbacks.

SUMMARY OF THE INVENTION

The present invention is directed to a power converter having integrated AC/DC and DC/DC converters that share common transformer magnetics and a common output rectifier.

In an illustrative embodiment of the invention, a power converter for starting an AC machine comprises at least one transformer for stepping-up AC source voltages, at least one rectifier for rectifying output voltages from the at least one transformer, a three phase inverter for inverting rectified voltages from the at least one rectifier for providing three phase voltages for starting the AC machine, and a DC to AC converter for converting DC source voltage to AC inverted voltages. The three phase voltages for starting the AC machine are derived from one of the AC and DC source voltages through the at least one transformer and the at least one rectifier.

Preferably, the at least one transformer has a set of first primary windings connected in wye for receiving the AC source voltages and a set of second primary windings

2 connected in wye for receiving the inverted voltages of the DC source voltage. In addition, half of the transformer secondary windings may be connected in wye and the other half of the secondary windings may be connected in delta. This topology results in low harmonic generation.

Advantageously, with a common rectifier to rectify the transformer output voltages, and with the same transformer magnetics being utilized for both the AC/DC and DC/DC operating modes, power converters in accordance with the present invention have integrated AC/DC and DC/DC converter portions. This integration serves to minimize the total components, allowing the converter to be both compact and lightweight—two critical attributes for aerospace applications.

BRIEF DESCRIPTION OF THE FIGURES

For a better understanding of the present invention, reference is had to exemplary embodiments thereof, considered in conjunction with the accompanying figures in which like reference numerals designate like elements or features, wherein:

FIG. 3A is a schematic diagram of a second embodiment of the invention, particularly useful for low power applications.

DETAILED DESCRIPTION OF PREFERRED EMBODIMENTS

Figure 1:
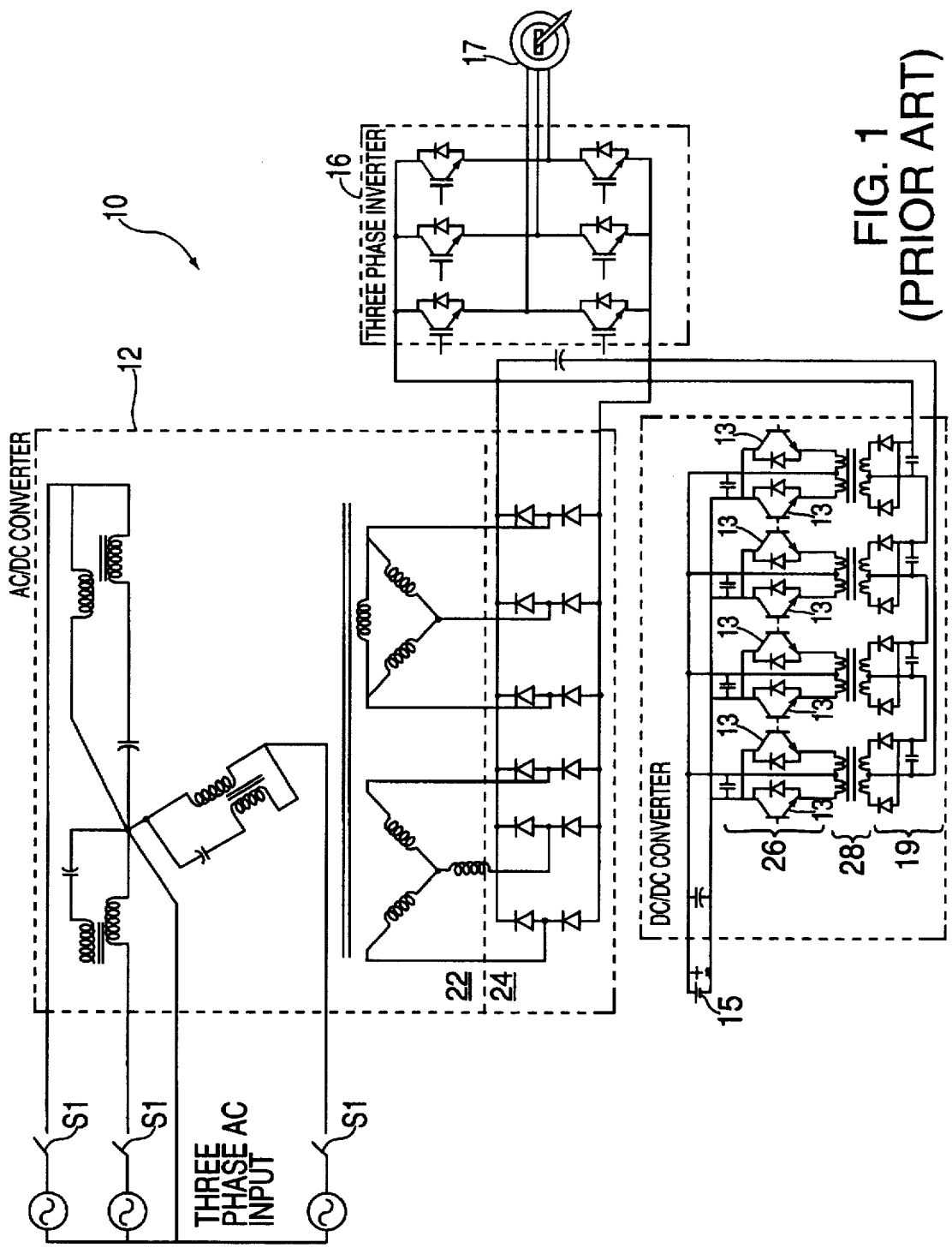
FIG. 1 schematically illustrates a prior art start converter.
Figure 2A:
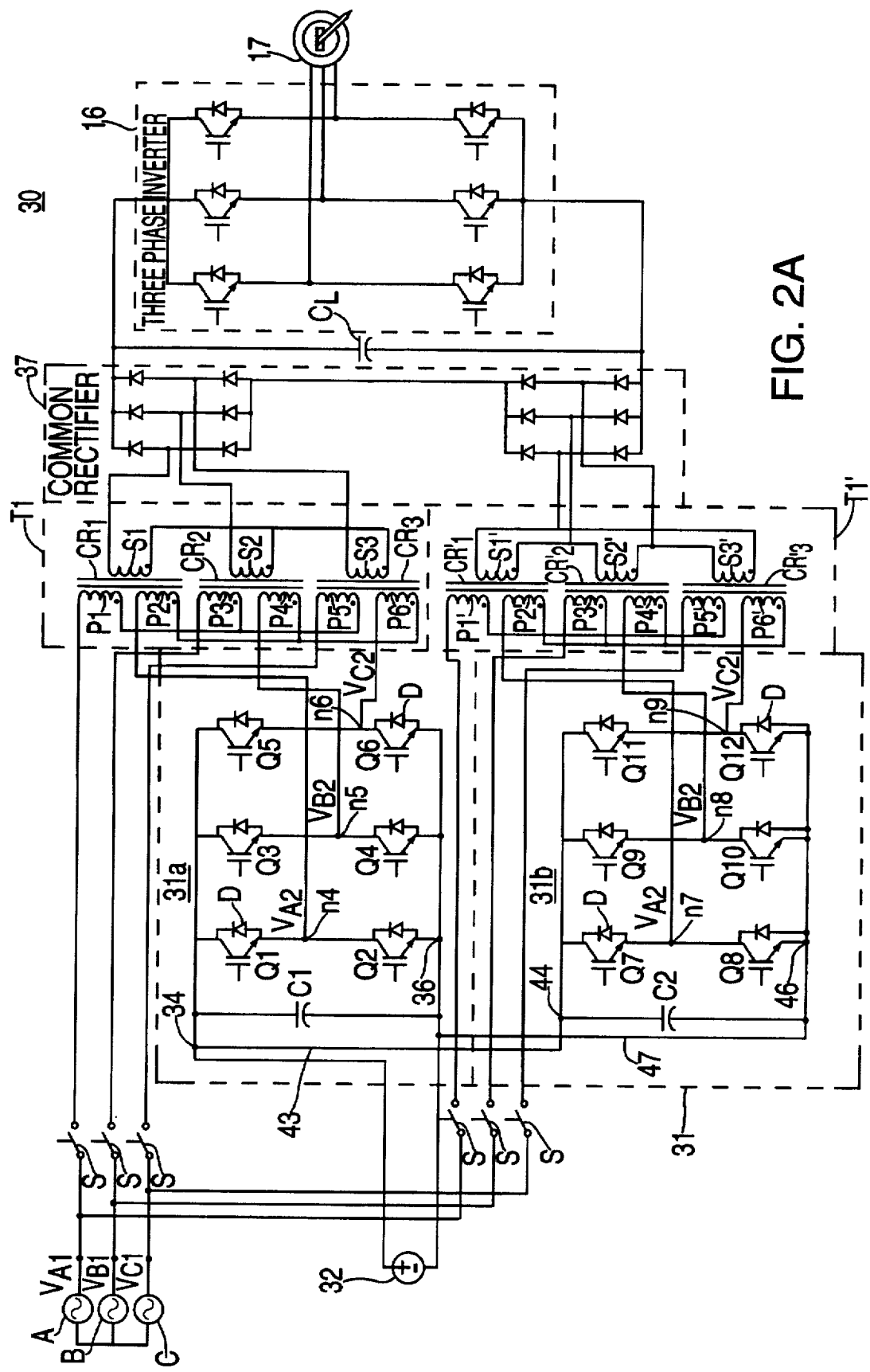
FIG. 2A is a schematic diagram of a first embodiment of the present invention particularly suitable for high power applications.

Referring to FIG. 2A, there is shown a power converter 30, which is a first embodiment of the present invention. Converter 30 is particularly useful for high power applications, e.g., output power between 5 kW and 30 kW.

In a first mode of operation, AC machine 17 is started by using three phase AC input voltage from sources A, B, C. This AC input voltage is stepped up by transformers T1 and T1'. The transformer outputs are rectified to provide DC voltage and then inverted to produce AC with variable frequency and voltage to start AC machine 17. In a second mode of operation, AC machine 17 is started from power originating from DC battery 32. Converter 30 converts the DC input voltage of battery 32 to three phase AC by means of inverter 31. This three phase AC is then stepped up, rectified and inverted again to produce variable frequency, variable voltage AC to start AC machine 17. Advantageously, both operating modes utilize common magnetics of transformers T1 and T1' and a common rectifier bridge 37 to rectify the stepped up voltages. Advantages of this circuit topology include reduced complexity and weight in comparison to prior art designs.

Three phase transformer T1 is comprised of six primary windings P1 to P6 and three secondary windings S1 to S3. (The term "primary winding", when used herein, refers to a winding, disposed on a transformer core, that receives an AC input voltage. The term "secondary winding", when used herein, refers to a winding that provides a transformed output voltage induced by application of an input voltage to an associated primary winding. The side of the transformer core in which the windings are shown herein does not dictate whether a particular winding is a primary or secondary winding).

AC voltage applied to winding P1 or P2 induces voltage in winding S1, voltage in windings P3 or P4 induces voltage in winding S2 and voltage in windings P5 or P6 induce voltage in winding S3. Transformer T1' can be of identical construction to transformer T1, with windings P1' to P6' and S1' to S3' being the same as corresponding windings P1 to P6 and S1 to S3.

Figure 2B:
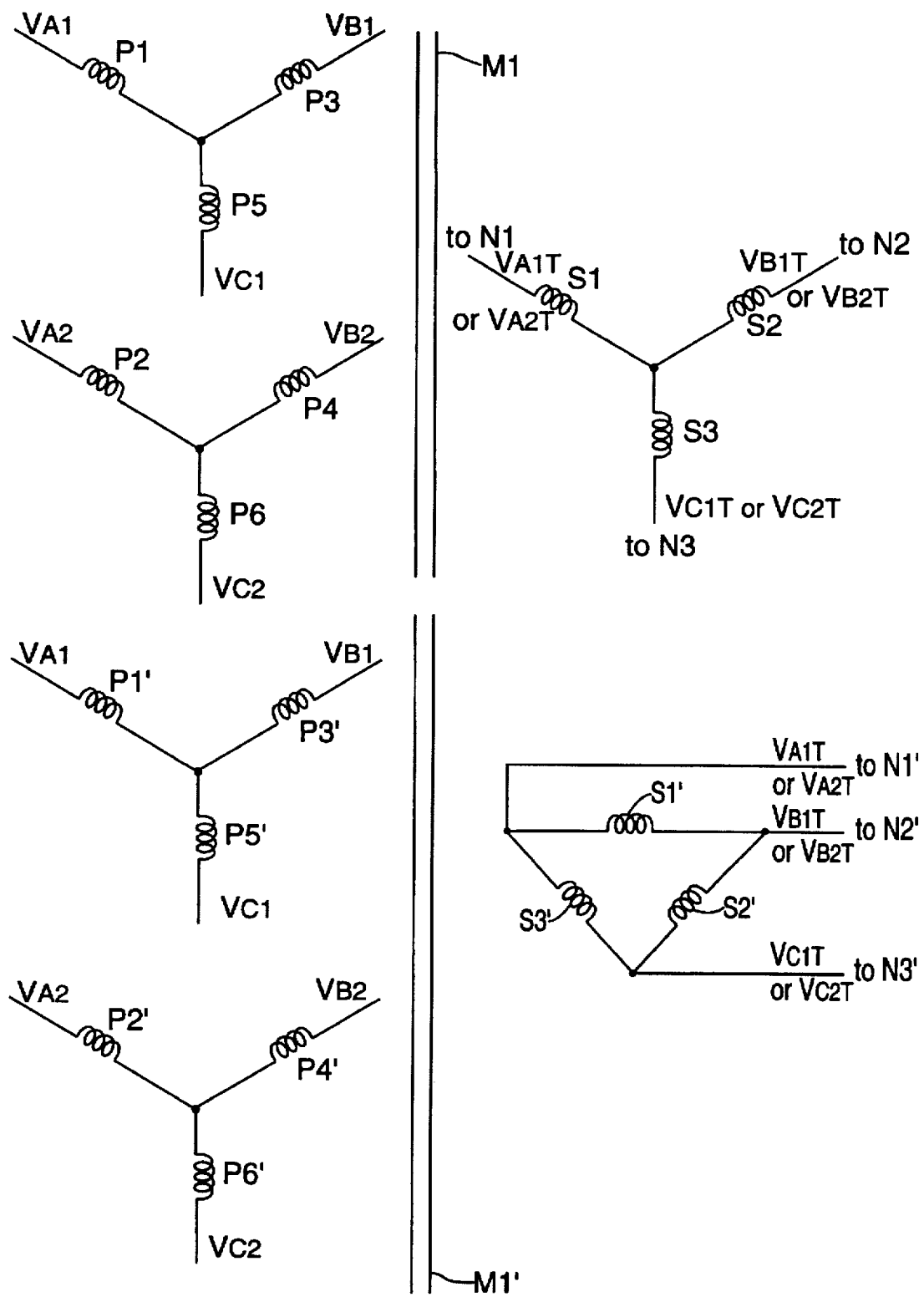
FIGS. 2B–2D are schematic diagrams further illustrating the first embodiment of FIG. 2A.

The windings of transformer T1 are preferably connected in a wye-wye configuration, while the windings of transformer T1' are preferably connected in a wye-delta configuration, as shown in FIG. 2A, and also shown schematically in FIG. 2B. Winding trios P1, P3, P5; P2, P4, P6; P1', P3', P5'; P2', P4', P6'; and, S1, S2, S3 are connected in wye whereas windings S1', S2' and S3' are connected in delta. This arrangement results in low harmonic power generation and a high power factor.

Consequently, a harmonic filter is typically not needed with the preferred topology. (It is noted that each of magnetic cores M1 and M1' of FIG. 2B may comprise a single three-phase core or three separate cores as CR1, CR2, CR3).

Figure 2C:
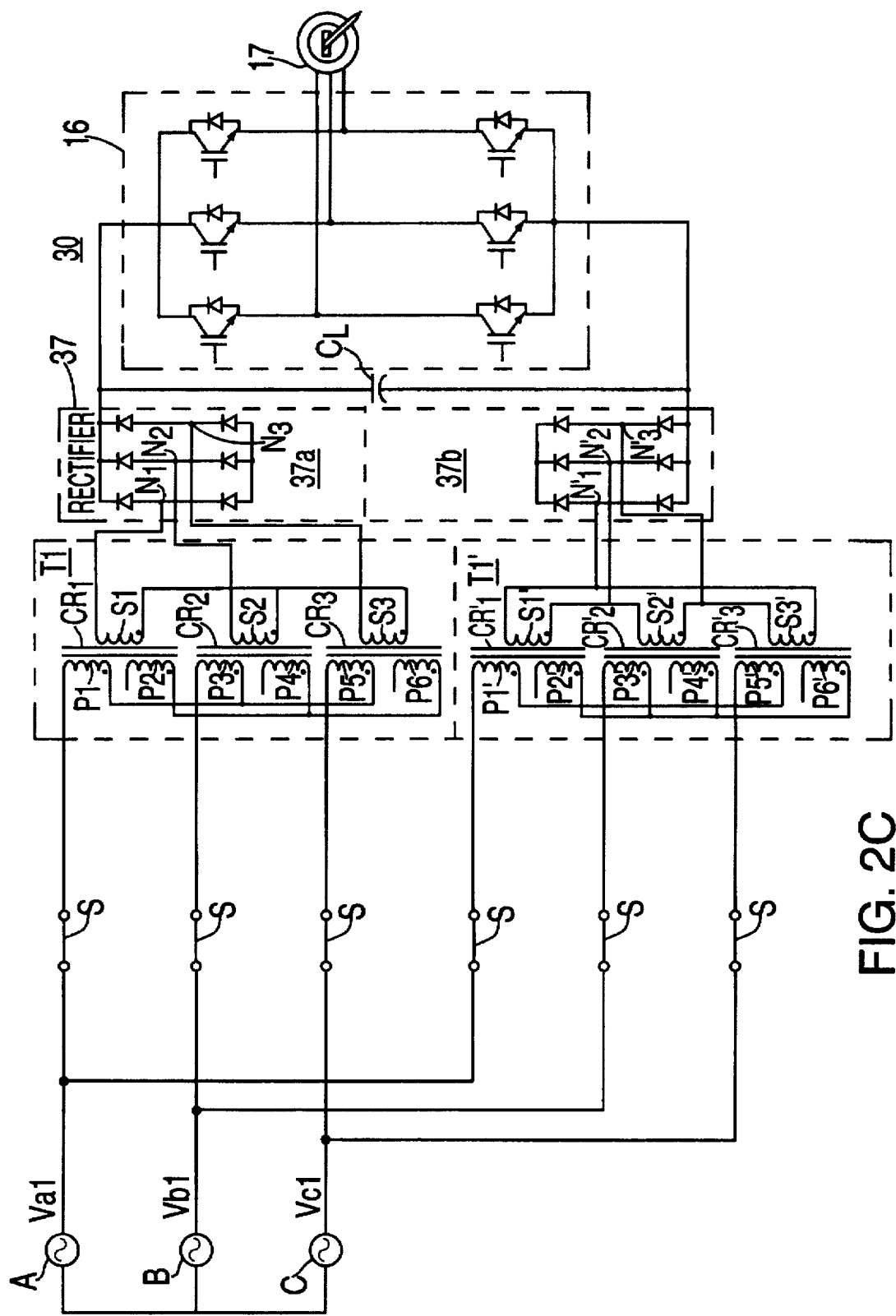

Detailed operation of the two operating modes are as follows. In the first mode, i.e., AC/DC/AC, transistors Q1 to Q12 of inverter 31 are OFF, thereby preventing the DC battery 32 voltage from being applied to the transformer windings. For the start operation, each of switches S are closed via appropriate control means (not shown) to enable the three phase AC voltage $V_{A1}(=V<0°)$, $V_{B1}(=V<120°)$ and $V_{C1}(=V<-120°)$ to be applied to the respective primary windings of transformers T1 and T1'. FIG. 2C further illustrates the first mode. Inverter 31 is omitted for clarity. AC current flows through primary windings P1, P3, P5, and P1', P3' and P5', and no current flows through the other primary windings. By way of example, voltages $V_{A1}$, $V_{B1}$ and $V_{C1}$ may be on the order of 115 V at 400 Hz, and the windings on transformers T1 and T1' can be designed to either step up or step down the three phase voltage. The respective transformed (e.g., stepped up) three phase voltage is designated as voltages $V_{A1T}$, $V_{B1T}$ and $V_{C1T}$ in the first operating mode. These voltages are applied to nodes N1-N3 and N1'-N3' of respective rectifier bridges 37a and 37b (which together comprise common rectifier 37). The rectified outputs are filtered by capacitor $C_L$ to produce DC link voltage, which is provided to three phase inverter 16. Inverter 16 converts the rectified waveform back to AC as the transistors are periodically switched on and off by an appropriate control means (not shown). By pulse width modulation control, a variable speed and amplitude three phase output voltage can be produced. The inverter output voltages are used to start AC machine 17.

Figure 2D:
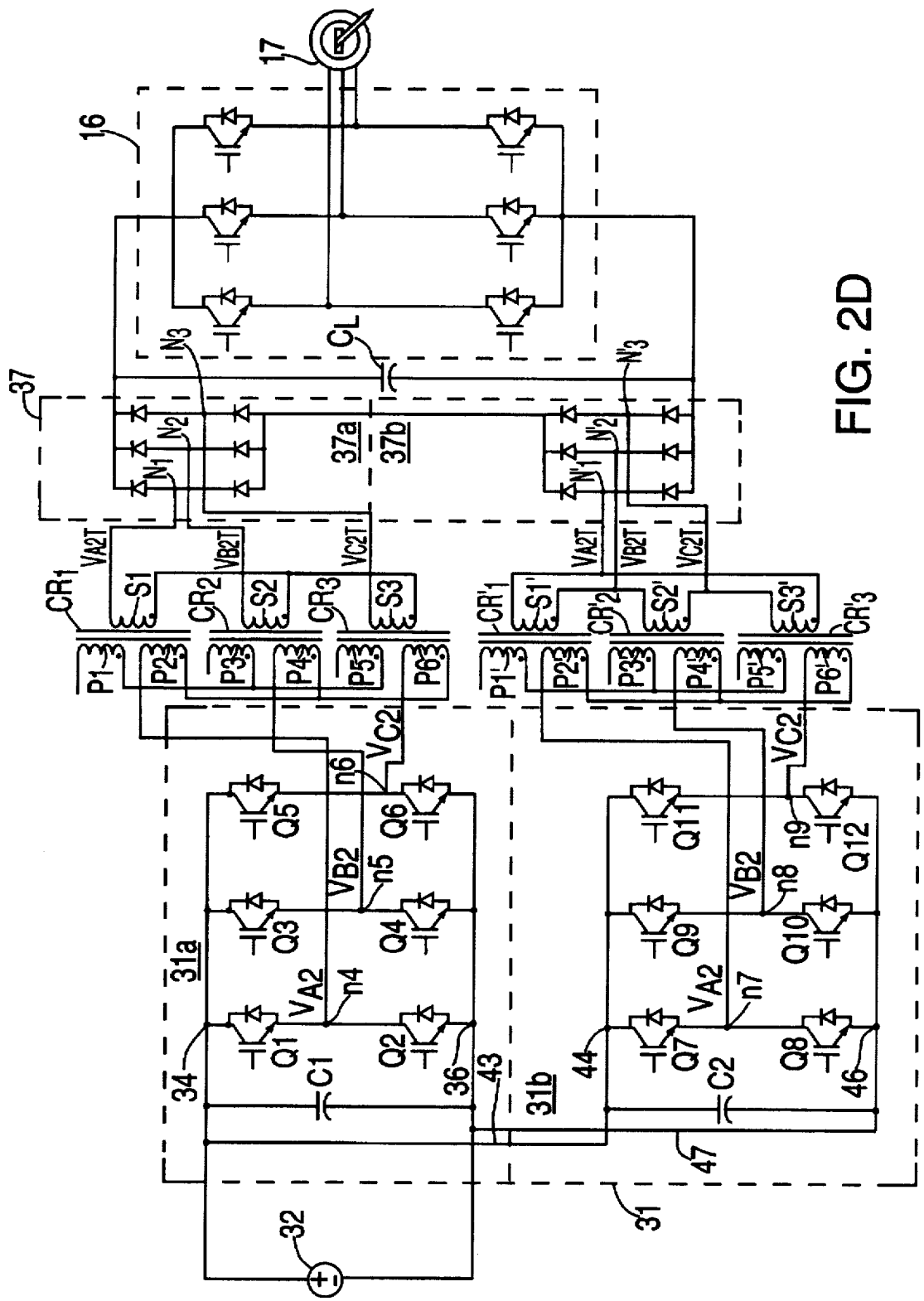

Referring now to FIG. 2D, which illustrates the second mode, utilizing the DC input portion of converter 30, the AC machine 17 is started with power originating from DC battery 32. In this mode, the switches S are all opened. The voltage of battery 32, e.g., 24 or 48 V, is applied to both of three phase inverters 31a and 31b, which are connected in parallel and which together comprise input inverter 31. Voltage supplied to inverter 31a is filtered by capacitor C1 connected across circuit nodes 34 and 36; voltage to inverter 31b is filtered by capacitor C2 connected across circuit nodes 44 and 46, with nodes 36 and 46 being connected via lead 47 and nodes 34 and 44 being connected via lead 43. Transistors Q1–Q6 are periodically switched on and off in a conventional manner via a suitable three phase controller (not shown) to produce three phase AC voltage. This three phase voltage at nodes n4, n5 and n6 is designated as voltages $V_{A2}$, $V_{B2}$ and $V_{C2}$, respectively (and differ in phase from one another by 120° at the three nodes). Transistors Q7 to Q12 are also periodically switched on and off to produce essentially the same three phase voltage at nodes n7, n8 and n9, with the voltage phases at nodes n7, n8 and n9 being the same as the phases at nodes n4, n5 and n6, respectively.

The three phase voltage at nodes n1, n2 and n3 produce AC in windings P2, P4, and P6, thereby inducing voltage in secondary windings S1, S2 and S3. This produces transformer output voltages $V_{A2T}$, $V_{B2T}$ and $V_{C2T}$ at nodes N1, N2 and N3, respectively, which voltages correspond in phase to the respective input voltages $V_{A2}$, $V_{B2}$ and $V_{C2}$. The turns ratio between these primary and secondary windings are preferably designed to provide the same voltage amplitude as in the AC/DC conversion case (mode 1 discussed above). Likewise, the time varying voltages at nodes n7, n8 and n9 drive currents in windings L2', L4' and L6' thereby inducing corresponding voltage in coils S1', S2' and S3'. As a result, output voltages $V_{A2}$, $V_{B2}$ and $V_{C2}$ of preferably the same amplitude are provided at respective nodes N1', N2' and N3'. Rectifiers 37a, 37b then operate in the same manner as in the first mode discussed above to rectify and invert the transformer output voltages. The rectified voltages are filtered by capacitor $C_L$ to provide DC link voltage which is inverted by inverter 16 to produce three phase AC to start AC machine 17.

As mentioned above, instead of employing three separate magnetic cores for each of transformers T1 and T1', a three-phase transformer having a single magnetic core could be used for each of the two transformers. Thus, cores CR1, CR2 and CR3 (as well as cores CR1', CR2' and CR3'), could be replaced by a single magnetic core having three legs, with coils P1, P2, S1 wrapped around one of the three legs, coils P3, P4, S2 wrapped around another leg, and so forth. The use of a single three-phase transformer permits a savings of core material. It is noted that a further savings of core material can be attained by using a single magnetic core for the entire transformer T. However, this would be impractical for high power applications in which a large voltage boost occurs, e.g., 24/48 V originating from the DC battery being stepped up to 250–300 V on the output. High currents accompany the large step up in voltage—consequently, the use of at least two magnetic cores is preferred for this application.

Figure 3B:
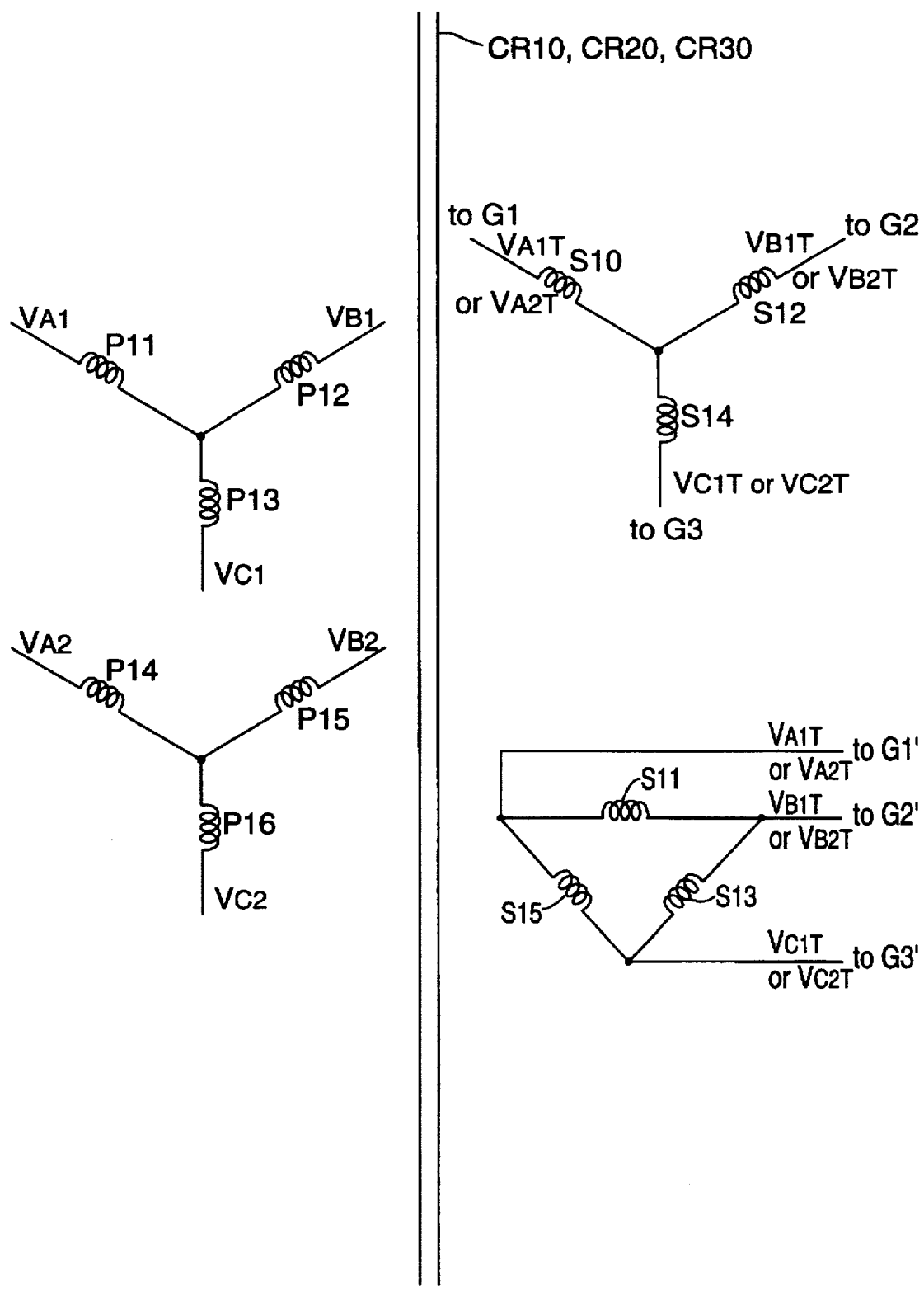
FIG. 3B schematically illustrates transformer winding connections of the second embodiment.

Referring now to FIG. 3A, a second embodiment of the present invention is shown, designated as power converter 50. This embodiment is particularly suitable for low power applications, e.g., less than 5 kW of output power. As in the high power embodiment of FIGS. 2, power converter 50 employs common transformer magnetics and a common rectifier, 57, for the AC/DC and DC/DC conversion circuitry.

Power converter 50 differs in topology from power converter 30 discussed above primarily via the utilization of a single three phase input inverter 31c and a twelve winding transformer T10. As is apparent from FIG. 3A, and which is shown schematically in FIG. 3B, primary windings P11, P12, P13 and P14, P15, P16 are connected in wye. Secondary windings S10, S12, S14 are also connected in wye, whereas secondary windings S11, S13, S15 are connected in delta. This topology is preferable to minimize harmonic pollution of the AC sources A, B and C. Also, single phase magnetic cores CR10, CR20 and CR30 are used for windings P11, S10, S11, S14; P12, S12, S13, P15; and P13, S14, S15, P16, respectively. These three cores can alternatively be replaced with a single, three phase magnetic core.

In a first mode of operation, i.e., AC/DC/AC power conversion, three phase AC energy from AC voltage sources A, B, C are applied to transformer T10 by closing each switch S and switching each of transistors 61 of inverter 31c OFF. Hence, AC voltages $V_{A1}$, $V_{B1}$ and $V_{C1}$ are applied to respective primary windings P11, P12, P13. Consequently, current flows through primary winding P11, inducing voltage in secondary windings S10 and S11. Likewise, current flow through winding P12 induces voltage in secondary windings S12, S13; current flow through winding P13 induces voltage in secondary windings S14 and S15. As a result, transformer output voltages $V_{A1T}$, $V_{B1T}$ and $V_{C1T}$ are produced and applied to circuit nodes G1, G2 and G3, respectively and to nodes G1', G2' and G3', respectively, of common rectifier 57. These voltages are stepped up versions of the respective AC input voltages $V_{A1}$, $V_{B1}$ and $V_{C1}$.

The rectified voltages from the upper and lower rectifier bridge portions of rectifier 57 are filtered by link capacitor $C_K$ to provide DC link voltage. Output inverter 58 converts the rectified output back to AC to drive AC machine 67.

In the second operating mode of power converter 50, the switches S are opened and the transistors 61 of input inverter 31c are alternately switched on and off by a three phase controller. This converts DC voltage, e.g., 24/48 V from battery 51 (which voltage is applied to inverter 31c via capacitor C5) to three phase AC voltage, namely, voltages $V_{A2}$, $V_{B2}$ and $V_{C2}$. These voltages are applied to respective primary windings P14; P15; and P16, thus driving current flow through secondary winding pairs S10, S11; S12, S13; and S14; S15, respectively. As a result, three phase transformer output voltages consisting of voltages $V_{A2T}$, $V_{B2T}$ and $V_{C2T}$ are produced and applied to nodes G1, G2, G3, respectively, and to nodes G1', G2', G3', respectively. These output voltages are preferably of the same amplitude as voltages $V_{A1T}$, $V_{B2T}$, $V_{C2T}$ of the first operating mode. Rectifier 57 and inverter 58 then operate in the same manner as the first mode to start AC machine 67.

Figure 4:
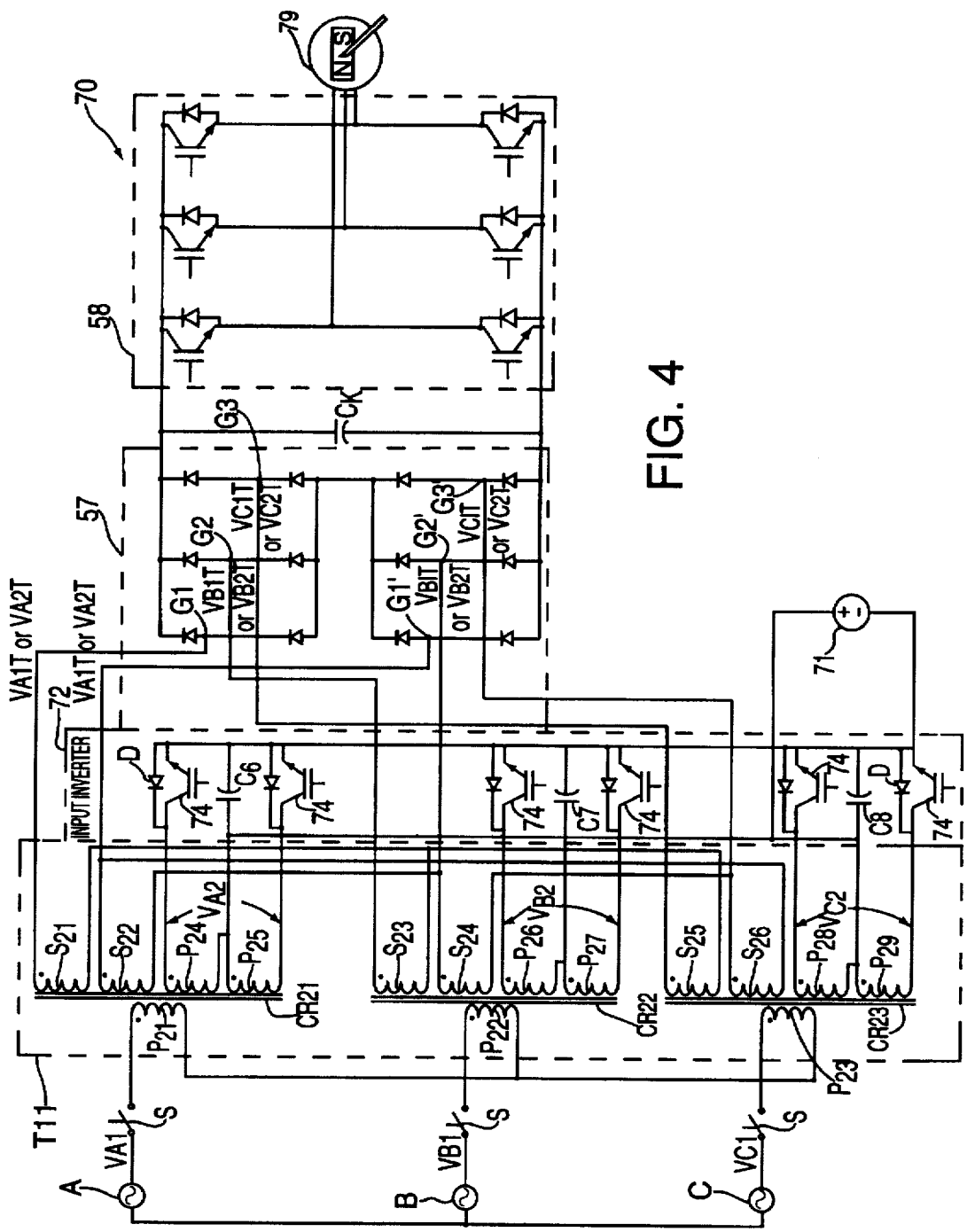
FIG. 4 schematically illustrates a third embodiment of the invention, useful for low power applications.

With reference now to FIG. 4, a third embodiment of the present invention, power converter 70, is particularly suitable for low battery voltage (e.g., 24 V) applications. This embodiment utilizes a transformer T11 having three primary windings P21–P23 used in a first operating mode (AC/DC/AC), six primary windings P24–P29 used in a second operating mode (DC/AC/DC/AC) and six secondary windings S21–S26 which provide three phase output voltage in either operating mode. Windings P21–P23 and S21, S23 and S25 are connected in wye; windings S22, S24, S26 are connected in delta; and winding pairs (P24, P25); (P26, P27); (P28, P29) are connected in push pull configuration as shown. Three single phase cores CR21–CR23 are employed; however, it is understood that a single three phase transformer could alternatively be utilized.

In the first operating mode, the switches S are closed and each transistor 74 of inverter 72 is switched OFF by a suitable control means. Voltages $V_{A1}$, $V_{B1}$ and $V_{C1}$ (e.g., 115 V RMS) are thus applied to respective windings P21–23, exciting secondary windings S21–S26 to produce corresponding transformer output voltages $V_{A1T}$, $V_{B1T}$ and $V_{C1T}$. In the second operating mode, the DC voltage of battery 71, e.g., 24 V, which is applied to transistors 74 via capacitors C6–C8, is converted to three phase AC by appropriate switching of transistors 74 via a control means. This three phase AC consists of voltages $V_{A2}$ across windings P24, P25; $V_{B2}$ across windings P26, P27, and $V_{C2}$ across windings P28, P29. The transformer steps up the voltage waveforms, thus producing transformer output voltages $V_{A2T}$, $V_{B2T}$ and $V_{C2T}$ (e.g., 200–300 V RMS). In both operating modes, rectifier 57 rectifies the respective transformer output voltages, and the rectified output is filtered by DC link capacitor CK to provide DC link voltage. This voltage is inverted to AC by output inventer 58, thereby starting AC machine 79.

For the low power applications mentioned above, the second embodiment of FIG. 3A is preferable when higher DC battery voltages are used, e.g., 48 V. On the other hand, the third embodiment of FIG. 4 is preferable for lower DC battery voltages, e.g., 24 V. The reason for this is that in the second embodiment, there are two transistors of the input inverter active at a time, while in the third embodiment, only one transistor of the input inverter is active at a time. As a result, there would be higher losses in the second embodiment if a lower DC voltage is used.

For any of the three embodiments of FIGS. 2–4, there may be applications where it is desirable to use only the DC output of the rectifier, rather than the AC output of the output inverters. Hence, for these applications, the output inverter would be omitted.

In addition, while the embodiments of the present invention disclosed above utilize three phase AC, the present invention may also be useful for other polyphase AC, e.g., six phase.

It will be understood that the embodiments described herein are merely exemplary and that one skilled in the art can make many modifications and variations to the disclosed embodiments without departing from the spirit and scope of the invention. All such variations and modifications are intended to be included within the scope of the invention as defined by the appended claims.

What is claimed is:

1. A power converter for starting an AC machine, comprising:
    at least one transformer for stepping-up AC source voltages;
    at least one rectifier for rectifying output voltages from said at least one transformer;
    a three phase inverter for inverting rectified voltages from said at least one rectifier for providing three phase voltages for starting said AC machine; and
    a DC to AC converter for converting DC source voltage to AC inverted voltages, wherein said three phase voltages for starting said AC machine are derived from one of said AC and DC source voltages through said at least one transformer and said at least one rectifier.

2. The power converter according to claim 1, wherein said DC to AC converter includes means for selectively switching said DC source voltage to produce said AC inverted voltages as three-phase AC voltage.

3. The power converter according to claim 1, wherein said at least one transformer comprises two transformers, each having a plurality of first primary windings adapted to receive said AC source voltages, a plurality of second primary windings each adapted to receive said AC inverted voltages derived from said DC source voltage, and a plurality of secondary windings for providing said transformer output voltages responsive to said AC source voltages being applied to said transformer in a first operating mode and to said AC inverted voltages being applied to said transformer in a second operating mode.

4. The power converter according to claim 3, wherein said first primary windings of each of said transformers comprise three windings connected in a wye configuration, said second primary windings of each of said transformers comprise three windings connected in a wye configuration, said secondary windings on one of said transformers comprise three windings connected in a wye configuration, and said secondary windings on the other of said transformers comprise three windings connected in a delta configuration.

5. The power converter according to claim 4, wherein each of said transformers has three magnetic cores, with one of said first primary windings, one of said second primary windings, and one of said secondary windings wound on each magnetic core.

6. The power converter according to claim 1, wherein said at least one rectifier comprises a pair of rectifier bridges each coupled to secondary windings of said at least one transformer, each said rectifier bridge providing DC output voltages, and, said DC output voltages being combined with a DC link capacitor to provide said rectified voltages, said rectified voltages being applied to said three phase inverter.

7. The power converter according to claim 1, wherein said DC source voltage is on the order 48 V volts DC, said AC source voltages are on the order of 115 volts three phase AC, and wherein said rectified voltage derived from either said AC or DC source voltages is on the order of 270 volts.

8. A power converter, comprising:

a transformer having a plurality of first primary windings each adapted to receive one of a plurality of first AC input voltages of a polyphase AC voltage source, a plurality of second primary windings each adapted to receive one of a plurality of second AC input voltages, and a plurality of secondary windings, wherein transformer output voltages are provided across at least a common one of said secondary windings when either said first or second AC input voltages are applied to the respective primary windings in first or second operating modes, respectively;

an input inverter for generating said second AC input voltages in a polyphase relationship to each other from a DC source; and a common rectifier for rectifying the transformer output voltages across said common secondary windings, whereby said power converter provides a DC output in each of said operating modes.

9. The power converter according to claim 8, further comprising a polyphase output inverter coupled to said rectifier for converting said DC output to an output polyphase AC voltage capable of starting an AC machine.

10. The power converter according to claim 8, wherein said transformer output voltages are stepped up voltages of said first or second AC input voltages.

11. The power converter according to claim 8, wherein:

said first inverter comprises a plurality of transistors arranged in a parallel configuration to provide said second AC input voltages when said transistors are alternately switched on and off, said power converter further comprising a plurality of switches coupled between said AC polyphase input source and said first primary windings and means for closing said switches and turning off said transistors to thereby apply only said first AC voltages to said transformer during said first mode of operation, and means for opening said switches and alternately switching said transistors on and off to apply only said second AC input voltages to said transformer during said second mode of operation.

12. The power converter according to claim 8, wherein:

each of said secondary windings are wound on a magnetic core common to at least one of said first primary windings and at least one of said second primary windings, each of said secondary windings thereby being common secondary windings;

said transformer output voltages thereby being produced across each said secondary winding in both of said operating modes.

13. The power converter according to claim 12, wherein:

said polyphase AC voltage source comprises a three phase AC source, and said polyphase relationship of said second AC input voltages provided by said input inverter is a three phase relationship;

said plurality of first primary windings comprises six primary windings, with each of said first AC input voltages of the same phase being applied to two associated first primary windings in said first operating mode;

said plurality of second primary windings comprises six primary windings with each of said second AC input voltages of the same phase being applied to two associated second primary windings in said second operating mode; and said plurality of secondary windings comprises six secondary windings, each having one of said transformer output voltages induced thereacross in both said first and second operating modes.

14. The power converter according to claim 12, wherein:

said polyphase AC voltage source comprises a three phase AC source, and said polyphase relationship of said second AC input voltages provided by said input inverter is a three phase relationship;

said plurality of first primary windings comprises three windings, each receiving one of said first AC input voltages in said first operating mode;

said plurality of second primary windings comprises three windings, each receiving one of said second AC input voltages in said second operating mode; and, said plurality of secondary windings comprises six windings, each having one of said transformer output voltages induced thereacross in both said first and second operating modes.

15. The power converter according to claim 14, wherein said DC source provides an input voltage to said inverter of about 48 volts, and further wherein said power converter provides output power of less than about five kilowatts.

16. The power converter according to claim 14, wherein said first primary windings are connected in wye, said second primary windings are connected in wye, three of said secondary windings are connected in wye, and the other three of said secondary windings are connected in delta.

17. A power converter, comprising:

a transformer having three first primary windings each adapted to receive one of three first AC input voltages of a three phase AC voltage source in a first operating mode, six second primary windings each connected to another of said second primary windings in a push-pull configuration to form three pairs of second primary windings, with each pair receiving one of three second AC input voltages applied across that pair of windings in a second operating mode, and six secondary windings, each of said secondary windings being wound on a magnetic core common to at least one of said first primary windings and at least one of said second primary windings, wherein transformer output voltages are provided across each of said secondary windings when either said first or second AC input voltages are applied to the respective primary windings in said first or second operating modes, respectively;

an input inverter for generating said second AC input voltages in a three phase relationship to each other from a DC source; and a common rectifier for rectifying the transformer output voltages across said secondary windings, whereby said power converter provides a DC output in each of said operating modes.

18. The power converter according to claim 17, wherein:

said transformer has three magnetic cores, with one of said first primary windings, one pair of said second primary windings and two of said secondary windings wound on each of the three cores;

said rectifier is comprised of first and second rectifier bridges, each said bridge receiving one of said transformer output voltages from one secondary winding of each core such that three phase output voltage is received at each bridge, each said bridge rectifying said three phase output voltage to provide a rectified output voltage in both of said operating modes, said rectified output voltage of each bridge being combined via a DC link capacitor to provide said DC output;

said power converter further comprising an output inverter operative to convert said output of said link capacitor to an AC voltage capable of starting an AC machine.

19. The power converter according to claim 17, wherein said first primary windings are connected in wye, said pairs of second primary windings are connected in wye, three of said secondary windings are connected in wye, and the other three of said secondary windings are connected in delta.

20. The power converter according to claim 17, wherein said input inverter comprises six transistors, with a diode coupled in a reverse bias connection across each transistor, each transistor having first and second conducting terminals and a control terminal, said six transistors arranged in three parallel pairs;

each parallel pair of transistors having one pair of said second primary windings coupled between the first conducting terminals of the two transistors of the pair, with the second conducting terminals of the pair electrically connected to form a first circuit node, said first circuit node being common to all six of said transistors; and said input inverter further having three capacitors, each coupled between said first circuit node and a second circuit node, said second circuit node being a common circuit node of each of said second primary windings, with said DC source being coupled between said first and second circuit nodes and said transistors being alternately switched on and off to provide said second AC input voltages to said second primary windings.

* * * * *